United States Patent
Yamaji et al.

(10) Patent No.: US 11,466,971 B2
(45) Date of Patent: Oct. 11, 2022

(54) AUTOMATIC MEASURING DEVICE

(71) Applicant: Mitutoyo Corporation, Kawasaki (JP)

(72) Inventors: Masashi Yamaji, Hiroshima (JP); Hideyuki Morimoto, Hiroshima (JP); Kazuma Sorada, Hiroshima (JP)

(73) Assignee: MITUTOYO CORPORATION, Kawasaki (JP)

( * ) Notice: Subject to any disclaimer, the term of this patent is extended or adjusted under 35 U.S.C. 154(b) by 73 days.

(21) Appl. No.: 17/227,828

(22) Filed: Apr. 12, 2021

(65) Prior Publication Data

US 2021/0372762 A1 Dec. 2, 2021

(30) Foreign Application Priority Data

May 28, 2020 (JP) .............................. JP2020-093046

(51) Int. Cl.
*G01B 3/18* (2006.01)
*G01B 5/08* (2006.01)
*G01B 5/20* (2006.01)

(52) U.S. Cl.
CPC .................................... *G01B 5/08* (2013.01); *G01B 5/20* (2013.01)

(58) Field of Classification Search
CPC .................................... G01B 3/18; G01B 5/02
USPC .......................... 33/803, 813, 819, 820, 828
See application file for complete search history.

(56) References Cited

U.S. PATENT DOCUMENTS

| 4,070,760 | A * | 1/1978 | Roth ........................ G01B 3/18 33/DIG. 1 |
| 6,834,439 | B2 * | 12/2004 | Matsumiya ............ B82Y 30/00 33/784 |
| 7,779,550 | B2 * | 8/2010 | Li ............................. G01B 3/22 33/549 |
| 9,207,056 | B2 * | 12/2015 | Biselx ..................... G01B 3/205 |
| 9,267,779 | B2 * | 2/2016 | Emtman ................. G01B 3/205 |
| 9,678,701 | B2 * | 6/2017 | Cook ...................... G01B 3/205 |
| 9,689,652 | B2 * | 6/2017 | Jordil ................... G01B 21/047 |
| 11,025,151 | B2 * | 6/2021 | Okano ................. G01B 5/0004 |

FOREIGN PATENT DOCUMENTS

| JP | H08-14871 | 1/1996 |
| JP | H10-89903 | 4/1998 |
| JP | 2019-100904 | 6/2019 |

* cited by examiner

*Primary Examiner* — George B Bennett
(74) *Attorney, Agent, or Firm* — Rankin, Hill & Clark LLP (57) ABSTRACT

There is provided an automatic measurement device that automates a contact type measuring instrument, which is inexpensive and good usability. An automatic measurement device includes a measuring instrument support base portion that supports a measuring instrument and a workpiece holding base portion that holds a workpiece in a measurement region of the measuring instrument. The measuring instrument support base portion includes a measuring instrument holder that holds a fixed element of the measuring instrument and an automatic operation unit attachable to and detachable from the measuring instrument. The automatic operation unit is configured to automate advance and retreat of the movable element of the measuring instrument by a power from a motor.

12 Claims, 6 Drawing Sheets

FIG. 6

AUTOMATIC MEASURING DEVICE

TECHNICAL FIELD

The present invention relates to an automatic measurement device that automatically measures a workpiece using a small-sized measuring instrument for measuring dimensions of the workpiece.

BACKGROUND ART

Micrometers and calipers are known as measuring instruments (measurement tools) that measure dimensions of a workpiece. These contact type measuring instruments (measurement tools) have advantages, such as ease of use, stability of measurement, and comparative inexpensiveness, and are widely used.

However, because the workpiece and a movable element (a spindle or a measurement jaw) need to be appropriately brought into close contact and further be measured while always applying a same measurement pressure, so the measurement is inevitably manually performed by manpower. As a result, the measurement with such a contact type measurement tool takes manpower and time.

As an alternative to the manual measurement, one using non-contact type measuring equipment, such as an air micrometer and a laser scan micrometer, in a production site has been proposed (JP 8-14871 A). However, the air micrometer and the laser scan micrometer themselves are extremely expensive, and there is a problem that maintenance is somewhat difficult.

CITATION LIST

Patent Literature

Patent Document 1: JP 10-89903 A
Patent Document 2: JP 2019-100904 A
Patent Document 3: JP 8-14871 A

SUMMARY OF INVENTION

Technical Problem

To automate the contact type measurement, although various proposals using a motor power have been made up to the present, there were no cases in which practical use was successful for widespread use (JP 10-89903 A).

Obviously, the use of, for example, a three-dimensional measuring device (CMM) allows the automated contact type measurement (JP 2019-100904 A). However, this requires investment from several tens of millions yen to several hundred millions yen, and thus employing the three-dimensional measuring device as the substitute for the measurement performed by the micrometer or the caliper is not reasonable.

An object of the invention is to provide an automatic measurement device that automates a contact type measuring instrument, which is inexpensive and has good usability.

Solution to Problem

An automatic measurement device of the invention automatically measures a workpiece using a measuring instrument. The measuring instrument measures a dimension of the workpiece. The automatic measurement device includes the measuring instrument, a measuring instrument support base portion, and a workpiece holding base portion. The measuring instrument support base portion supports the measuring instrument. The workpiece holding base portion holds the workpiece in a measurement region of the measuring instrument. The measuring instrument includes: a fixed element; a movable element provided to be displaceable with respect to the fixed element, the movable element advancing and retreating to approach and separate from the workpiece; and a displacement detection unit configured to detect the displacement of the movable element. The measuring instrument support base portion includes: a measuring instrument holder that holds the fixed element of the measuring instrument; and an automatic operation unit attachable to and detachable from the measuring instrument, the automatic operation unit being configured to automate the advance and the retreat of the movable element by power from a motor.

One embodiment of the invention is preferably configured as follows. When the workpiece abuts on the movable element, at least one of the workpiece held to the workpiece holding base portion and the measuring instrument held to the measuring instrument holder changes a position and a posture at a pressure equal to or less than a predetermined measurement pressure preset to the measuring instrument such that the workpiece and the movable element are held with abutment surfaces mutually in close contact.

One embodiment of the invention is preferably configured as follows. The workpiece holding base portion is a workpiece placement base on which the workpiece is placed.

One embodiment of the invention is preferably configured as follows. The workpiece holding base portion includes workpiece holding means that holds the workpiece. One of the workpiece holding means and the measuring instrument holder is provided so as to permit a relative displacement with respect to another.

One embodiment of the invention is preferably configured as follows. The measuring instrument includes an operation unit originally for a manual operation. The operation unit is configured to advance and retreat the movable element by a manual rotation operation or a manual pushing operation. The automatic operation unit is attachable to/detachable from the operation unit. The automatic operation unit is configured to operate the operation unit by the power from the motor to automate the advance and the retreat of the movable element.

One embodiment of the invention is preferably configured as follows. The measuring instrument is a micrometer. The micrometer includes: a U-shaped frame as the fixed element including an anvil at one end inside a U shape thereof; and a spindle as the movable element provided on another end side of the U-shaped frame, the spindle being provided to be axially advanceable and retreatable with respect to the anvil. The automatic operation unit includes: the motor; and a power transmission unit configured to directly or indirectly connect an output shaft of the motor to the spindle to convert the power from the motor into the advance/retreat of the spindle.

One embodiment of the invention is preferably configured as follows. The automatic operation unit is provided such that a position is changeable in a direction orthogonal to a center axis of the spindle such that a rotation axis of a rotor of the motor is collinear with the center axis of the spindle.

One embodiment of the invention is preferably configured as follows. The micrometer includes a thimble disposed at another end of the spindle on another end side of the U-shape frame. A rotation operation is performed on the thimble originally by a finger. The power transmission unit includes: an anchor ring fitted to an outside of the thimble; a rotation plate provided to rotate in synchronization with a rotation shaft of a rotor of the motor; and a transmission link rod disposed parallel to a center axis of the spindle. The transmission link rod has one end fixed to the anchor ring and another end fixed to the rotation plate. The transmission link rod rotates with the center axis of the spindle as a center of the rotation to transmit the rotation of the rotation plate to the anchor ring.

One embodiment of the invention is preferably configured as follows. A constant pressure mechanism is provided between the thimble and the spindle. The constant pressure mechanism is configured such that when a preset load is applied to the spindle, the constant pressure mechanism disengages the thimble and the spindle to cause the thimble to idle with respect to the spindle.

One embodiment of the invention is preferably configured as follows. The automatic operation unit includes a motor controller configured to control a rotation of the motor. The motor controller has a torque detection function of the motor. The motor controller has, as a control mode of a motor rotation number: a high-speed rotation mode as a high-speed rotation; and a low-speed rotation mode at a speed lower than a rotation speed in the high-speed rotation mode. When a motor rotation direction in a direction of advancing the spindle is defined as a forward rotation, and when the motor rotation direction in a direction of retreating the spindle is defined as a reverse direction, the motor controller is configured: to advance the spindle in the forward rotation in the high-speed rotation mode; such that when the torque detection function detects an abutment between the spindle and the workpiece, the motor controller retreats the spindle in the reverse rotation in the high-speed rotation mode by a predetermined first rotation number; to subsequently advance the spindle in the forward rotation in the low-speed rotation mode by the first rotation number, and subsequently further drive the motor in the forward rotation in the low-speed rotation mode by a predetermined second rotation number; and afterwards, to drive the motor in the forward rotation in the high-speed rotation mode by a predetermined third rotation number.

An automatic measurement system of the invention includes the automatic measurement device and workpiece conveyance means configured to pick up the workpieces and sequentially convey the workpieces to the workpiece holding base portion.

An automatic measurement device of the invention automates a measuring instrument. The measuring instrument causes a movable element to be in contact with a workpiece to measure a dimension of the workpiece. The automatic measurement device includes a measuring instrument support base portion and a workpiece holding base portion. The measuring instrument support base portion supports the measuring instrument. The workpiece holding base portion holds the workpiece in a measurement region of the measuring instrument. The measuring instrument support base portion includes: a measuring instrument holder that holds a fixed element of the measuring instrument; and an automatic operation unit attachable to and detachable from the measuring instrument, the automatic operation unit being configured to automate the advance and the retreat of the movable element by a power from a motor.

DESCRIPTION OF EMBODIMENTS

An embodiment of the invention will now be described with reference to the drawings and the reference numerals appended to the elements illustrated in the drawings.

First Embodiment

A first embodiment of the invention will now be described.

Figure 1:
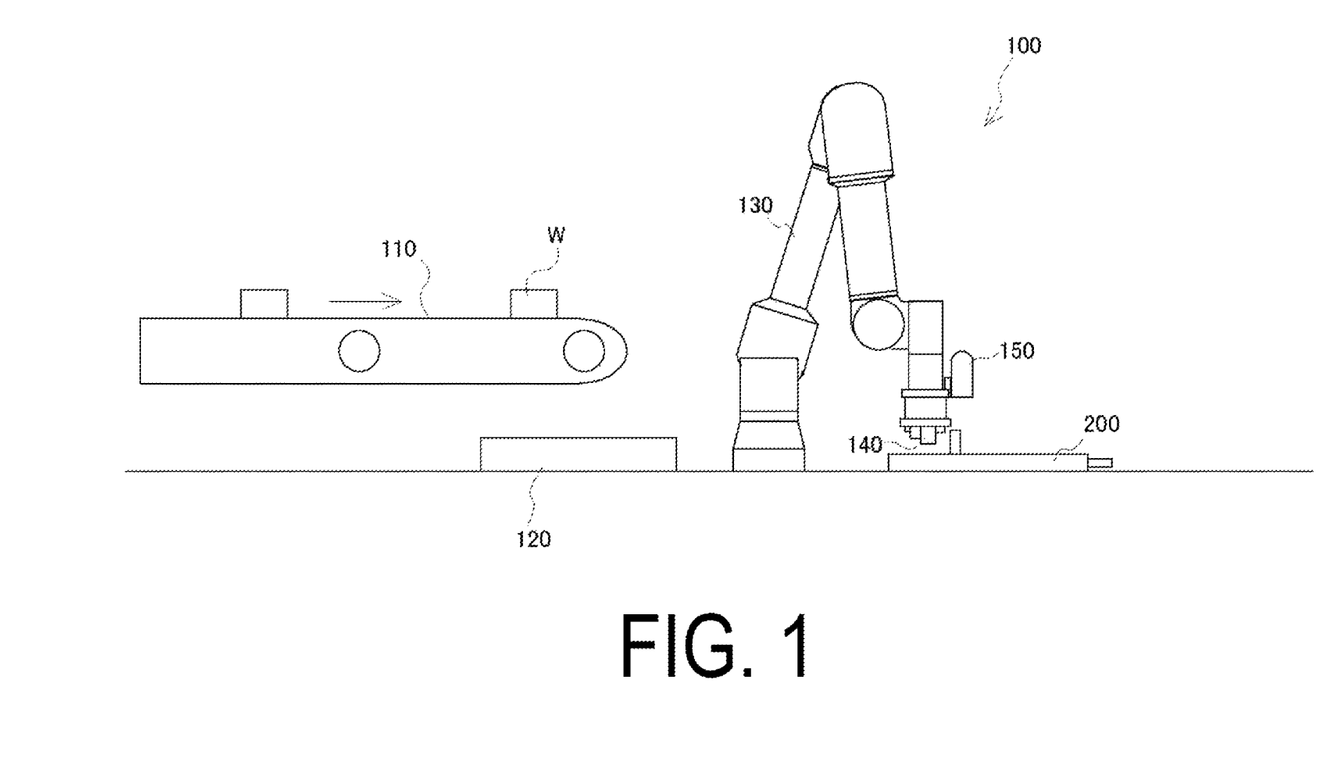
FIG. 1 is an overall configuration diagram of an automatic measurement system.

FIG. 1 is an overall configuration diagram of an automatic measurement system 100.

For example, a workpiece W (for example, a component) machined by a machine tool (for example, an NC lathe) is carried by a belt conveyor 110.

The workpiece W is transferred to a storage 120 for pretreatment. As the pretreatment, deoil and dedusting may be performed by, for example, air blow. The pre-treated workpiece W is carried into a measurement region of an automatic measurement device 200 by, for example, a robot arm 130. The robot arm 130 is, for example, the articulated robot arm 130 that includes a robot hand 140 to hold the workpiece W at its distal end and a camera 150 for image recognition.

The robot arm 130 recognizes the workpiece W by image recognition, grips the workpiece W by the robot hand 140, and carries the workpiece W to the measurement region of the automatic measurement device 200. Here, it is assumed that the robot hand 140 places the workpiece W in the measurement region with an orientation (posture) of the workpiece W in a preset orientation (posture), and once releases the workpiece W.

Note that a person may manually pick up and transport the workpiece W as a further simple system.

The automatic measurement device 200 measures dimensions of the workpiece W that has been carried to the measurement region in this manner.

The automatic measurement device 200 is the automatic measurement device 200 that automates a micrometer 300, which is a small-sized measuring instrument (small-sized measurement tool).

The automatic measurement device 200 of the present embodiment is referred to as the automatic micrometer device 200.

Figure 2:
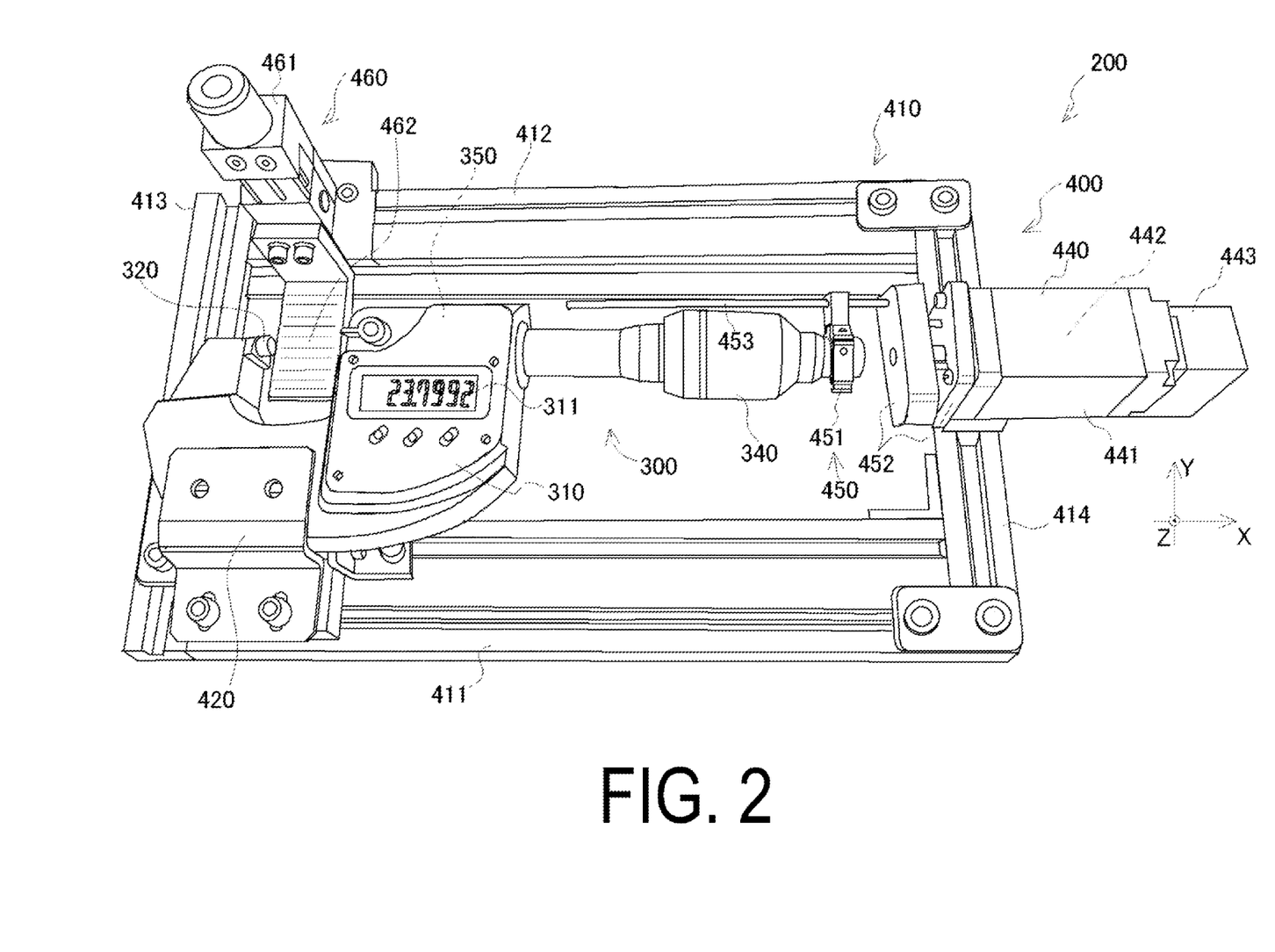
FIG. 2 is an external view of an automatic micrometer device.

FIG. 2 is an external view of the automatic micrometer device 200.

The automatic micrometer device 200 includes a micrometer 300, a measuring instrument support base portion 400, and a workpiece holding base portion 460.

The micrometer 300 is a small-sized measuring instrument that is manually operated originally, and the currently commercially available micrometer 300 only needs to be used as the micrometer 300 of the present embodiment.

The configuration of the micrometer 300 will be briefly described.

The micrometer 300 includes a U-shaped frame (fixed element) 310, a spindle (movable element) 330, a thimble portion 340, and a displacement detection unit 350.

The U-shaped frame 310 includes an anvil 320 at one end inside the U shape.

The spindle 330 is provided on the other end side of the U-shaped frame 310 and can axially advance and retreat with respect to the anvil 320.

A measurement surface for abutting on the workpiece W is provided on an end surface on one end side of the spindle 330. Similarly, a measurement surface for abutting on the workpiece W is provided on an end surface on the other end side of the anvil 320. The measurement surface is processed into a flat surface, and is made of, for example, a cemented carbide material or a ceramic.

The spindle 330 is fed to move so as to advance and retreat in the axial direction by a rotation operation of the thimble portion 340.

The feeding method of the spindle 330 includes a rotation feeding method in which the spindle 330 itself rotates and a linear feeding method in which the spindle 330 itself does not rotate.

In the rotation feeding method, the spindle 330 itself is provided with a male thread, and a female thread is provided on the U-shaped frame 310 side. Both are engaged such that the thimble and the spindle 330 rotate integrally, and the rotation operation of the thimble rotates the spindle 330. The spindle 330 then advances and retreats by the screw feeding.

In the linear feeding method, a feed screw is threaded at the inner side of the thimble portion 340, and the spindle 330 is provided with a pin that engages with the feed screw. With the rotation of the spindle 330 locked, rotating the thimble portion 340 feeds the spindle 330 by the engagement between the pin and the feed screw.

The type of the micrometer 300 employed in the present embodiment may be the rotation feeding method or the linear feeding method.

The thimble portion 340 is disposed at the other end of the spindle 330 on the other end side of the U-shaped frame 310.

The thimble portion 340 is an operation unit that advances and retreats the spindle 330 by the rotation operation.

Here, the micrometer 300 employed in the present embodiment is preferably a type including a constant pressure mechanism between the thimble portion 340 and the spindle 330.

The constant pressure mechanism releases the engagement between the thimble portion and the spindle 330 when a preset load is applied to the spindle 330, thus idling the thimble relative to the spindle 330.

By constantly activating the constant pressure mechanism appropriately in the same manner at the measurement, the measurement pressure at the measurement becomes constant, and measurement accuracy (repeatability) can be maintained high.

The constant pressure mechanism is also incorporated into the commercially available micrometer 300 and is disclosed in, for example, JP 3115555 B, JP 3724995 B, JP 5426459 B, and JP 5270223 B. The constant pressure mechanism can be configured by, for example, a ratcheting mechanism in which slippage occurs when a force at predetermined load or more is applied between the thimble and the spindle 330, and a leaf spring interposed between an outer sleeve and an inner sleeve of the thimble so as to cause slippage at a predetermined load or more.

Furthermore, the micrometer 300 employed in the present embodiment preferably includes a measurement pressure detection mechanism that detects the load applied to the spindle 330.

For example, the measurement pressure detection mechanism is disclosed in JP 3751540 B, JP 4806545 B, and JP 2019-190916 A.

The measurement pressure detection mechanism may directly or indirectly detect the load applied to the spindle 330 with, for example, a strain gauge. The measurement pressure detection mechanism may detect that the load applied on the spindle 330 has reached a predetermined value by activation of the constant pressure mechanism. The measurement pressure detection mechanism outputs a signal (measurement pressure signal) when a predetermined measurement pressure is detected. For example, in response to the predetermined measurement pressure being detected by the measurement pressure detection mechanism, the displacement detection unit 350 performs sampling (latch) of the measurement value (displacement amount).

The displacement detection unit 350 detects the displacement amount (or position) of the spindle 330. The displacement detection unit 350 is configured by a rotary encoder and a linear encoder.

Note that the displacement detection unit 350 may be an analog type (graduation type), not an encoder. In this case, in automation, the scale may be read by, for example, a digital camera, and the measurement value may be read by image analysis (image recognition).

In this case, the displacement detection unit may be configured by an analog scale, a digital camera, and an image recognition unit (image analysis unit).

Furthermore, a display panel unit 311 that displays the measurement value and a switch for operation are provided on the front surface of the U-shaped frame 310. Furthermore, a measurement value output function that externally outputs the measurement value in wired or wireless communications is equipped as a function of an electrical circuit unit built into the U-shaped frame 310.

Next, the measuring instrument support base portion 400 will be described.

The measuring instrument support base portion 400 includes a base frame body 410, a measuring instrument holder 420, and an automatic operation unit 440.

The base frame body 410 is generally a rectangular frame body.

For description, coordinate axes of XYZ orthogonal to each other are plotted as illustrated in FIG. 2.

Of four sides constituting the base frame body 410, two sides parallel to the X-axis direction are referred to as a first long side portion 411 and a second long side portion 412, and two sides parallel to the Y-axis direction are referred to as a first short side portion 413 and a second short side portion 414.

The first and second long side portions 411, 412 and the first and second short side portions 413, 414 are preferably, for example, stretchable so that the lengths can be adjusted. As a result, a size of the base frame body 410 can be adjusted according to sizes of the micrometer 300 and the workpiece W.

The measuring instrument holder 420 is installed on the first long side portion 411, the automatic operation unit 440 is installed on the second short side portion 414, and the workpiece holding base portion 460 is installed on the second long side portion 412.

At this time, the first long side portion 411 includes a rail so that the installation position of the measuring instrument holder 420 can be adjusted along the X-axis direction. Similarly, the second short side portion 414 includes a rail so that the installation position of the automatic operation unit 440 can be adjusted along the Y-axis direction. The second long side portion 412 includes a rail so that the installation position of the workpiece holding base portion 460 can be adjusted along the X-axis direction.

The measuring instrument holder 420 is fixedly attached to the first long side portion 411.

The measuring instrument holder 420 is a pressing plate.

With the pressing plate, the U-shaped frame (fixed element) 310 of the micrometer (measuring instrument) 300 is sandwiched between the first long side portion 411 and the pressing plate such that the micrometer 300 (measuring instrument) is mounted to the base frame body 410. It is assumed that as the orientation of the micrometer 300, the advance/retreat direction (axial direction) of the spindle 330 is parallel with the X axis, one end side (the anvil 320 side) of the U-shaped frame 310 is on the first short side portion 413 side, and the other end side (the thimble side) of the U-shaped frame 310 is on the second short side portion 414 side.

The automatic operation unit 440 automatically controls the advance/retreat of the spindle 330 (movable element) by a power from a motor 442.

The automatic operation unit 440 includes a motor housing 441, the motor 442, a power transmission unit 450, and a motor controller 443.

The motor housing 441 houses the motor 442 and the motor controller 443.

The motor housing 441 is disposed on an extended line of the center line of the spindle 330 (or the thimble portion 340) of the micrometer 300. That is, the automatic operation unit 440 is installed such that a rotation axis of a rotor of the motor 442 is collinear with the center axis of the spindle 330 (or the thimble portion 340). As necessary, the position of the motor housing 441 is preferably adjusted by moving the motor housing 441 along the rail of the second short side portion 414.

The motor 442 may be a usual electric motor that extracts the rotation of the rotor to an output shaft.

However, the motor 442 preferably can control a rotation angle (rotation number) of a forward rotation and a reverse rotation by a control pulse to some extent. Furthermore, the motor 442 preferably has a torque detection function. A stepping motor, for example, can be employed as the motor 442 (various methods for detecting a torque of the motor 442 itself have been known, for example, obtaining the torque from an increase/decrease in applied current (applied voltage). (Obviously, a servo motor or a synchronous motor may be used, and a structure and a driving method of the motor 442 are not particularly limited.)

The power transmission unit 450 includes an anchor ring 451 fitted to the outside of the thimble portion 340, a rotation plate 452 provided to rotate in synchronization with the rotation shaft of the rotor of the motor 442, and a transmission link rod 453 connecting the anchor ring 451 and the rotation plate 452.

One end of the transmission link rod 453 is fixed to the anchor ring 451, and the other end is fixed to the rotation plate 452. The transmission link rod 453 is parallel to the center axis of the spindle 330. When the rotation plate 452 is rotated by the motor 442, its rotation is transmitted to the anchor ring 451 by the transmission link rod 453, and the anchor ring 451 rotates in synchronism with the rotation plate 452.

The motor controller 443 controls the rotational drive of the motor 442 to control the advance/retreat of the spindle 330. The motor 442 control by the motor controller 443 will be described later.

Next, the workpiece holding base portion 460 will be described.

The workpiece holding base portion 460 holds the workpiece W as the measurement target in the measurement region of the micrometer 300 (measuring instrument).

The workpiece holding base portion 460 includes a support pillar 461 and a workpiece placement plate 462.

The support pillar 461 is mounted to the first long side portion 411.

The workpiece placement plate 462 is an L-shaped plate body having a surface parallel to the X-Y plane and is fixed to the support pillar 461. The position of the support pillars 461 may be adjusted along the second long side portion 412 such that the workpiece W held by the workpiece holding base portion 460 enters the measurement region of the micrometer (measuring instrument) 300. Furthermore, the height (position in the Z-axis direction) of the workpiece placement plate 462 may be adjusted such that the measurement target location (the measurement target part) of the workpiece W is sandwiched between the anvil 320 and the spindle 330.

The surface on which the workpiece W is placed of the workpiece placement plate 462 is a flat surface, and therefore the workpiece W placed and held on the placement surface easily changes its position and posture when pushed by the spindle 330. In other words, when the spindle 330 abuts on the workpiece W, the workpiece W is pushed toward the anvil 320 side, slides over the placement surface, and moves until in abutment with the anvil 320. Then, when the workpiece W abuts on the anvil 320, the movement of the workpiece W is restricted, and thus the workpiece W is sandwiched between the anvil 320 and the spindle 330. At this time, the workpiece W changes its posture so that the measurement surface of the anvil 320 and the contact surface of the workpiece W are in close contact and the measurement surface of the spindle 330 and the contact surface of the workpiece W are in close contact. In this manner, the workpiece W is not fixed, and the movement of the workpiece W is allowed to some extent on the placement surface. Accordingly, the measurement target part of the workpiece W can be gaplessly sandwiched tightly between the anvil 320 and the spindle 330.

In a case where a friction is too small, when the workpiece W is placed by the robot hand 140 or by person's hand on the workpiece W placement surface of the workpiece placement plate 462, it is apprehended that the workpiece W slides and falls and the orientation and the posture when the workpiece W is placed is displaced. Accordingly, irregularities are preferably processed so as to cause some extent of friction with the workpiece W. In a state in which the workpiece W is placed on the placement surface, when a force (for example, approximately 1 N to 5 N) at a set measurement pressure or less acts on the workpiece W, the position and the posture of the workpiece W can be preferably changed.

Operation Description

Figure 3:
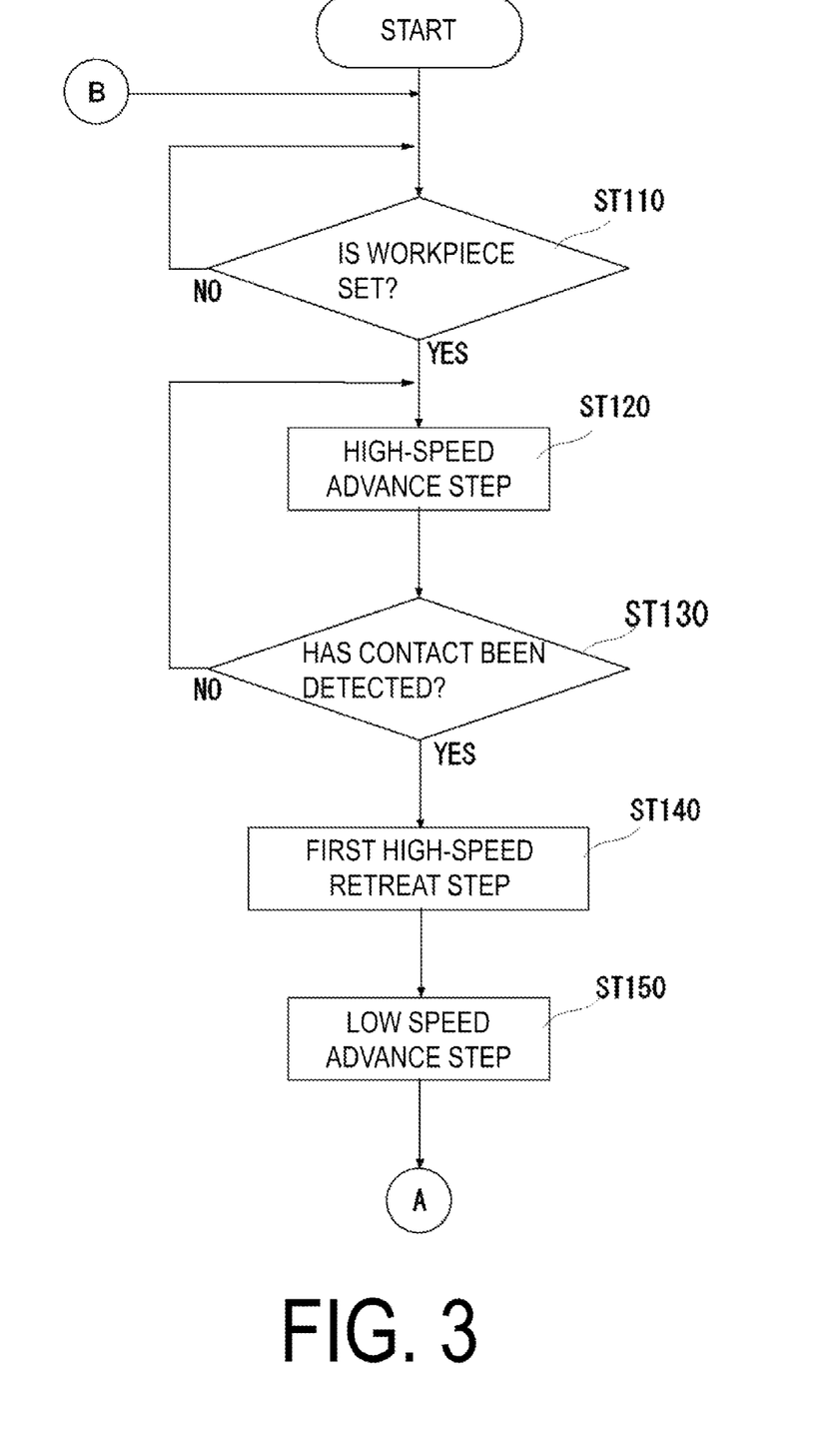
FIG. 3 is a flowchart for describing a measurement operation by the automatic micrometer device.
Figure 4:
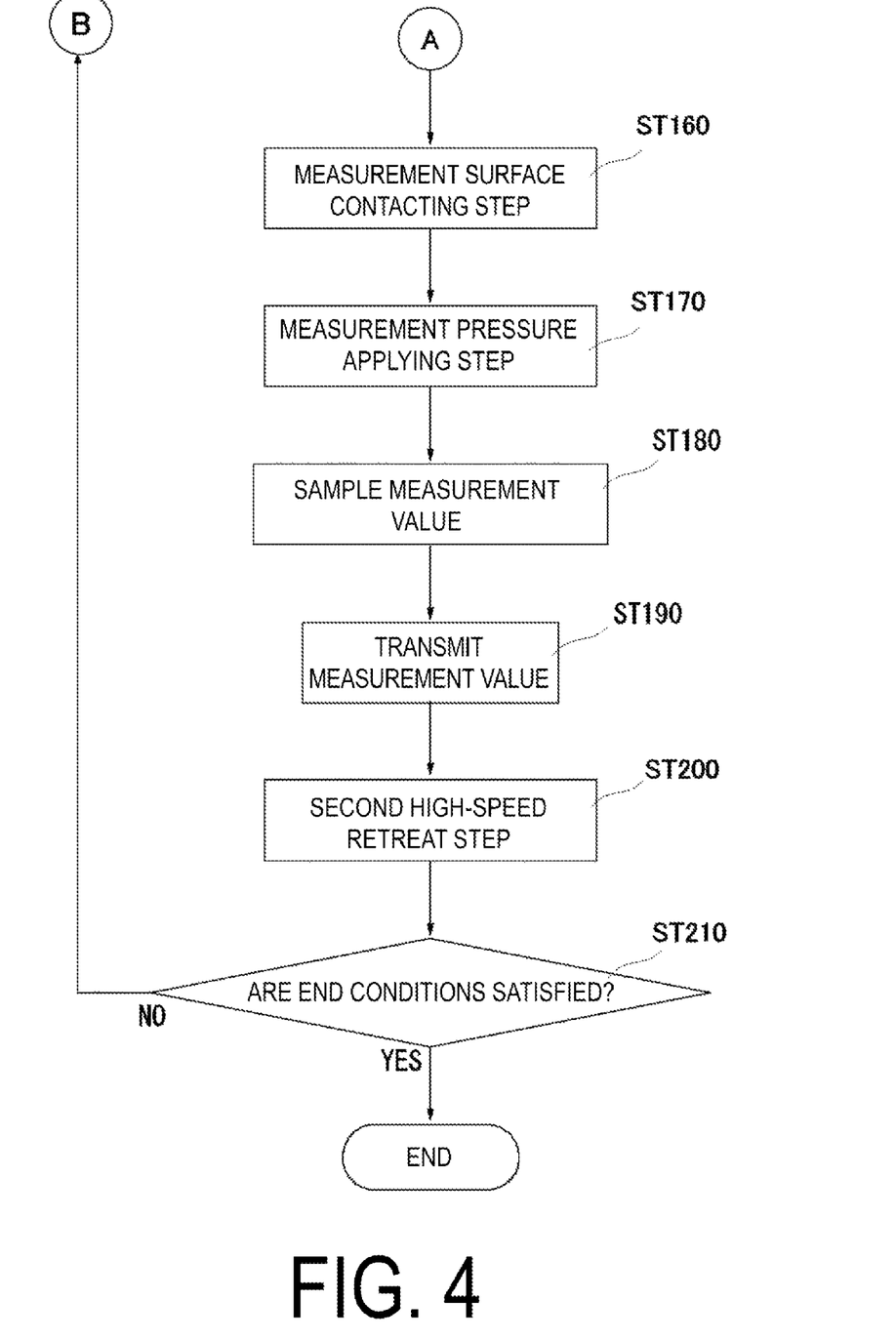
FIG. 4 is a flowchart for describing the measurement operation by the automatic micrometer device.

The operation of the automatic micrometer device 200 will be described.

FIG. 3 and FIG. 4 are flowcharts for describing the measurement operation by the automatic micrometer device 200.

When the setting of the workpiece W on the workpiece placement plate 462 by the robot arm 130 is detected (ST110: YES), the motor controller 443 performs preset (programmed) motor drive control.

First, the motor controller 443 causes the motor 442 to forward rotate at a comparatively high speed to advance the spindle 330 toward the anvil 320 (ST120). The rotation speed of the motor 442 at this time is, for example, 180 rpm (or, approximately from 100 rpm to 200 rpm).

Figure 5:
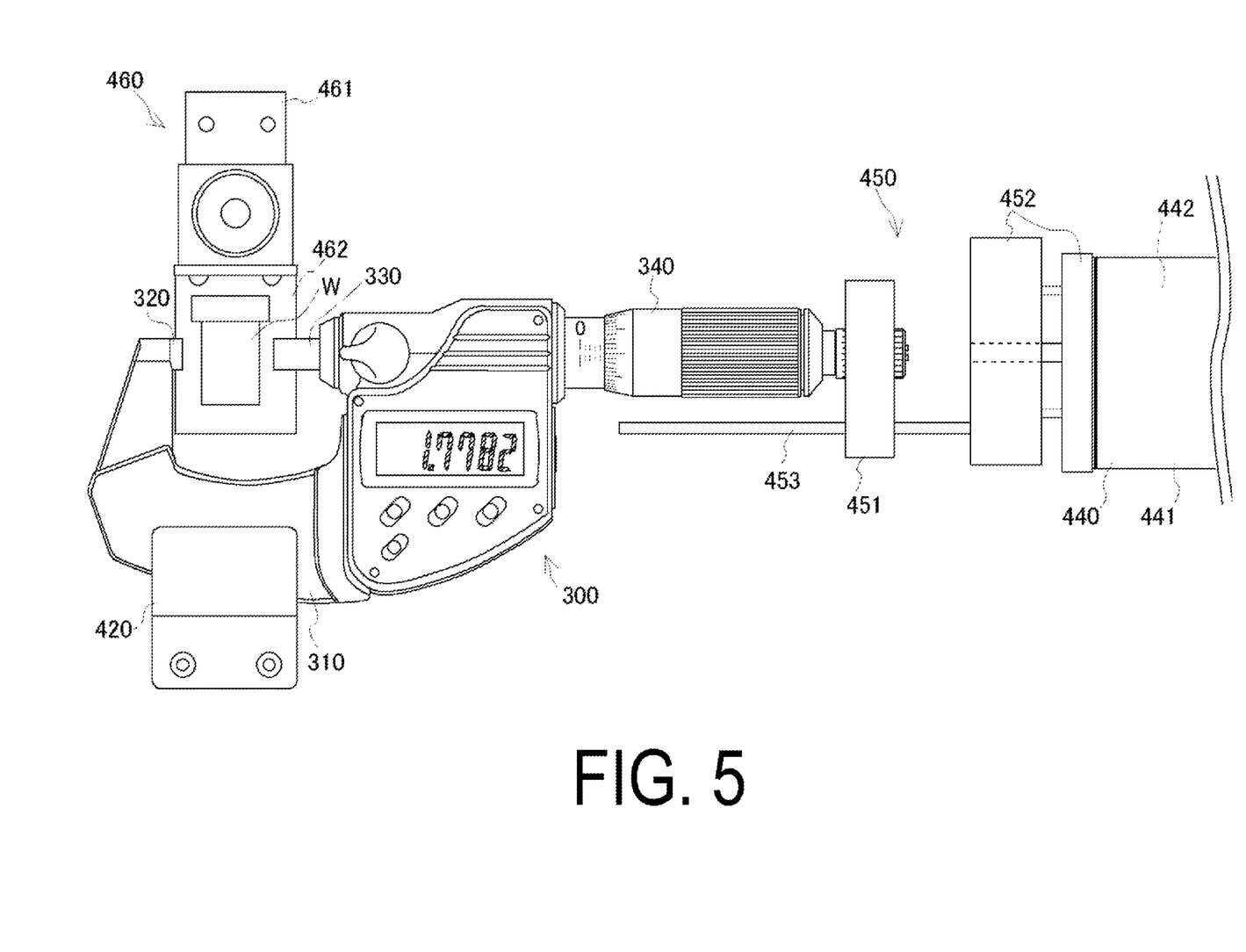
FIG. 5 is a drawing illustrating an example of a state in which a spindle advances.

For example, FIG. 5 is a drawing illustrating an example of a state in which the spindle 330 advances.

In ST120, it is considered that the rotation speed is preferably increased as much as possible in terms of shortening the measurement time. However, an excessively high rotation speed possibly damages the workpiece W when the spindle 330 abuts on the workpiece W. Furthermore, the excessively high rotation speed increases a centrifugal force generated in the power transmission unit 450, resulting in an increase in motor torque. As a result, due to the configuration in which the contact between the spindle 330 (anvil 320) and the workpiece W is detected by the magnitude of the torque, there is also a problem that the torque detection function incorrectly detects the contact between the spindle 330 (anvil 320) and the workpiece W. Accordingly, it is considered that setting a torque threshold for detecting the contact between the spindle 330 and the workpiece W first and rotating the motor at a speed not exceeding this torque threshold are preferred.

As the spindle 330 advances toward the anvil 320, the spindle 330 abuts on the workpiece W. Since the workpiece W is not fixed while placed on the workpiece placement plate 462, the workpiece W is pushed by the spindle 330 and moves directly, and contacts the anvil 320.

Figure 6:
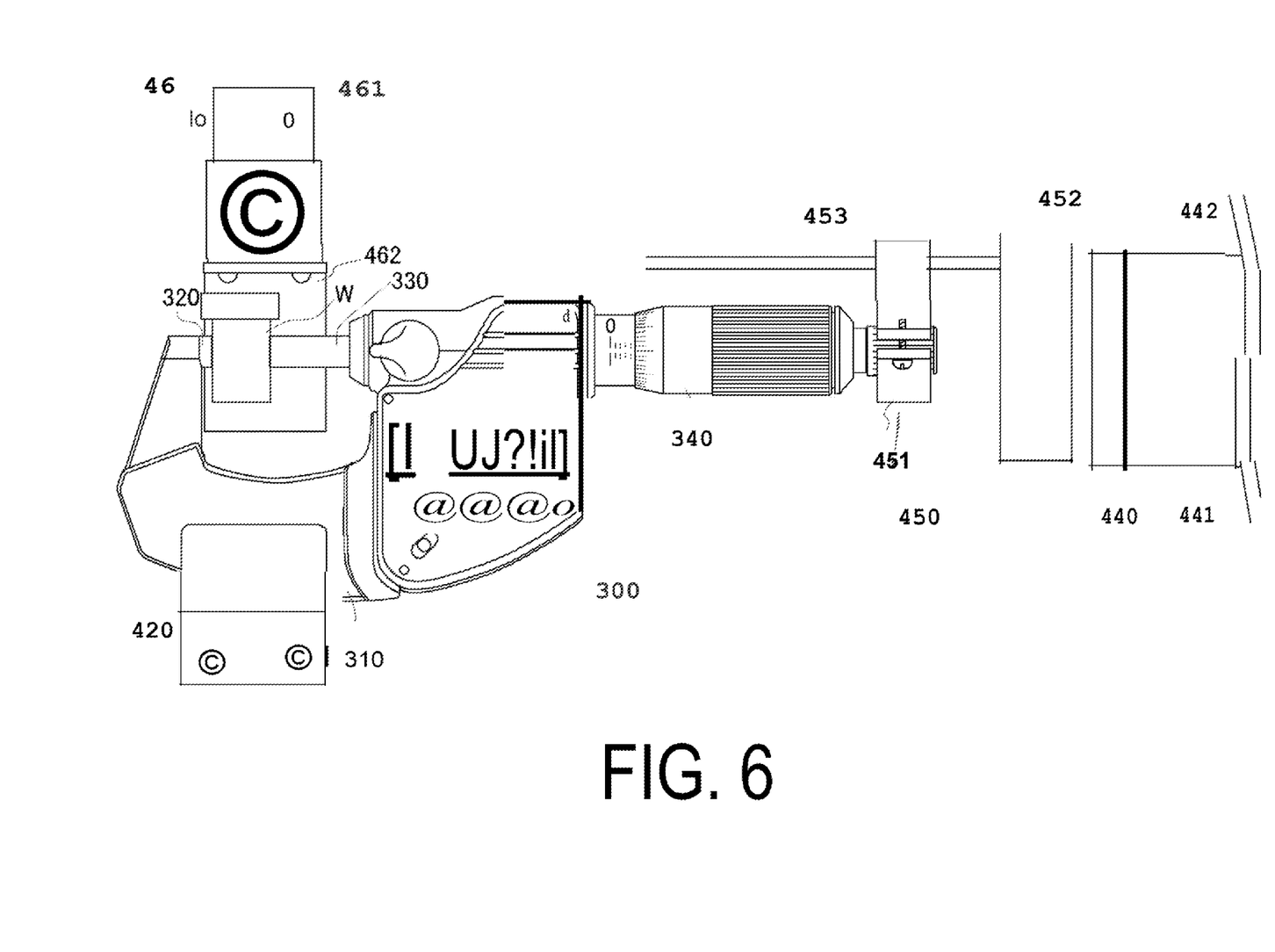
FIG. 6 is a drawing illustrating an example of a state in which a workpiece is sandwiched between the spindle and an anvil.

FIG. 6 is a diagram illustrating an example in a state in which the workpiece W is sandwiched between the anvil 320 and the spindle 330.

At the moment when the workpiece W is sandwiched between the anvil 320 and the spindle 330, the motor torque increases, and the motor controller 443 detects that the spindle 330 has contacted the workpiece W, that is, the contact of the anvil 320 and the spindle 330 with the workpiece W by a torque detection function (ST130: YES).

When the motor controller 443 detects that the spindle 330 has contacted the workpiece W, the motor controller 443 immediately reversely rotates the motor 442 at a comparatively high speed at a predetermined rotation number to retreat the spindle 330 (ST140).

The rotation speed of the reverse rotation is, for example, 180 rpm. In addition, the rotation number of the reverse rotation is, for example, 0.5 rotations. Note that the rotation speed (180 rpm) is an example, and the rotation speed during advance (ST120) may be same as the rotation speed during the reverse rotation (ST140), or may be different.

Here, rather than "stop" or "deceleration," the spindle 330 is preferably once retreated by the reverse rotation at a comparatively high speed.

The first reason is to reliably avoid biting of the spindle 330 into the workpiece W. Transmitting a control signal to once retreat the spindle 330 allows reliably avoiding the biting, rather than the just the stop. When the measurement pressure is generated, the constant pressure mechanism is activated. Meanwhile, to activate the constant pressure mechanism while advancing the spindle 330 always at the same speed, an activation distance of the spindle 330 needs to be ensured. Therefore, it is considered that the spindle 330 is preferably once stepped back so that the operation of applying the measurement pressure to the workpiece W can be always the same.

Next, the motor 442 is rotated forward at a comparatively slow speed to advance the spindle 330 toward the anvil 320 (ST150, ST160).

As a slow speed advancing step (ST150), the motor 442 is rotated forward at a comparatively low speed. The rotation number is same as the rotation number of the previous retreat (ST140). Here, the rotation number is, for example, 0.5 rotations at 9 rpm. While the workpiece W is slowly pushed, the contact between the workpiece W and the anvil 320 and the contact between the workpiece W and the spindle 330 are ensured.

Subsequently, as a measurement surface contacting step ST160, the motor 442 is rotated forward at a comparatively low speed (ST160). The rotation number is equivalent to, for example, a thimble rotation amount (rotation amount of the spindle 330) equivalent to an amount from when the workpiece W is in contact with the anvil 320 and the spindle 330 until the constant pressure mechanism is activated. Here, the rotation number is, for example, 0.5 rotations at 9 rpm. (This is the same as that in ST150, but the rotation speed and the rotation number may be changed as appropriate.)

Here, by once slowly activating the constant pressure mechanism, the contact surface between the workpiece W and the anvil 320, and the contact surface between the workpiece W and the spindle 330 closely fit (are in close contact).

In this state, the workpiece W is firmly sandwiched between the anvil 320 and the spindle 330. Thus, as a measurement pressure applying step (ST170), the motor 442 is rotationally driven in the forward direction at a comparatively high speed. For example, the motor 442 is rotated by three times at 180 rpm. At this time, the constant pressure mechanism is again activated, and a predetermined measurement pressure is applied.

Note that the motor rotation speed of this step (ST170) may be higher (for example, from 150 rpm to 250 rpm). The close fitting is completed in the previous step (ST160), and the contact surfaces between the spindle 330 (anvil 320) and the workpiece W are firmly and closely fitted. Accordingly, it is considered that the biting of the spindle 330 (anvil 320) and the workpiece W is less likely to occur.

Additionally, since the spindle 330 (anvil 320) and the workpiece W have already been in contact, there is no limitation caused by the contact between the spindle 330 (anvil 320) and the workpiece W that is incorrectly detected by the torque detection function.

In addition, the rotation number of this step (ST170) is the rotation number required to activate the constant pressure mechanism, and only needs to be approximately from 1.5 rotations to 3.5 rotations, which depends on a specification of the micrometer (the constant pressure mechanism) used.

The micrometer 300 samples the measurement value at the moment when the constant pressure mechanism is activated in the measurement pressure applying step (ST170) (ST180). The sampled measurement values (measured data) are externally output in wired or wireless communications (ST190), and the measurement data are collected and processed by an external personal computer (PC) or data processing apparatus.

Since one measurement value was able to be obtained up to the present, the motor controller 443 reversely rotates the motor 442 at a comparatively high speed to retreat the spindle 330. This measurement operation is continued while the workpiece W is exchanged.

The automatic measurement system 100 of the present embodiment almost automates the measuring work of the workpiece W.

The automatic micrometer device 200 of the present embodiment automates the micrometer 300 as a contact type small-sized measuring instrument (small-sized measurement tool). Since the micrometer 300 can be expected to have already been present in general factories, only preparing the measuring instrument support base portion 400, the workpiece holding base portion 460, and the automatic operation unit 440 allows achieving the automation of the micrometer 300. That is, a cost required for the introduction of automatic measurement can be extremely inexpensive, substantially contributing to a solution for a labor shortage.

Since the micrometer 300 is the contact type, measurement stability is extremely high. Additionally, the history of the micrometer 300 is long and has been widely spread in the world, thus being a measuring instrument most familiar to measurement workers. Accordingly, required handling, such as a calibration operation of the micrometer 300, is fully familiar to the workers, and there is almost no need to newly remember or train difficult working procedures.

While various automatic measurement devices have been proposed in the past, most of them use non-contact type measurement tools. For example, in most cases, for example, an air micrometer or a laser scan micrometer has been used. However, such non-contact type measurement equipment is extremely expensive and is somewhat difficult to maintain. In this regard, the automatic micrometer device 200 of the present embodiment that allows automating the micrometer 300 has an advantage of being inexpensive and easy to be handled.

One reason for difficulty in automating the micrometer 300, which is representative of the contact type small-sized measuring instrument (small-sized measurement tool), is that correctly sandwiching the workpiece W from both sides and closely fitting the contact surfaces (measurement surfaces) has been difficult.

In this regard, in the present embodiment, the relative position between the workpiece W and the micrometer 300 is not fixed, and the position and the posture can be changed by the force equal to or less than the measurement pressure.

Additionally, the constant pressure mechanism provided with the micrometer 300 and a torque detection mechanism provided with the motor 442 are comprehensively used. The spindle 330 is advanced and retreated in several stages, and particularly the step of firmly and closely fitting (closely contacting) the measurement surfaces (contact surfaces) (ST160) and the step of applying the predetermined measurement pressure (ST170) are performed.

Typically, to manually rotate the thimble, the thimble is rotated at a constant speed, and a constant pressure is applied with the constant rotation as it is for measurement. The thimble is not reversed or the constant pressure mechanism is not activated in two stages between a slow speed and a high speed. Meanwhile, in repeated experiments with conditions changed, a control step different from the manual operation was devised to ensure obtaining a stable measurement value in the automatic measurement as well.

This allows achieving the automation of the micrometer 300. Furthermore, the motor control allows the workpiece W to be measured always in the same movement. Accordingly, a problem in which the measurement value differs depending on a learning level and a habit of a movement of each worker is solved.

The invention is not intended to be limited to the above-described embodiments, and appropriate variations can be made thereon without departing from the spirit of the invention.

In the embodiment described above, the workpiece W is placed on the workpiece placement plate 462, but the workpiece W may be gripped (held). In this case, workpiece holding means may be mounted and supported to the workpiece holding base portion 460 via a floating joint that permits translation, for example, a parallel leaf spring. Alternatively, the workpiece holding means may be a robot arm. (In this case, the robot arm or a robot hand, which is the workpiece holding means, may include a floating joint that permits translation, for example, a parallel leaf spring).

Obviously, the measuring instrument support base portion 400 may be configured to permit translation, and in this case, the measuring instrument holder 420 may be mounted to the base frame body 410 via the floating joint.

The translation direction to be permitted is at least a direction parallel to the advance/retreat direction of the spindle 330 (the axial direction of the spindle 330).

In a case where a slight freedom of rotation is required to closely fit the contact surfaces of the spindle (anvil) and the workpiece, a rotation shaft may be provided. Alternatively, for example, the change of the orientation (posture) may be permitted by, for example, elasticity of the leaf spring.

As an operation example of the above-described embodiments, the operation of measuring the workpiece W is employed as an example. It is obvious that setting of a base point and calibration using a gauge block can be performed in the same operation.

REFERENCE SIGNS LIST

100 . . . Automatic measurement system
110 . . . Belt conveyor
120 . . . Storage
130 . . . Articulated robot arm
140 . . . Robot hand
150 . . . Camera
200 . . . Automatic micrometer device (automatic measurement device)
300 . . . Micrometer (measuring instrument)
310 . . . U-shaped frame (fixed element)
320 . . . Anvil
330 . . . Spindle (movable element)
340 . . . Thimble portion
350 . . . Displacement detection unit
400 . . . Measuring instrument support base portion
410 . . . Base frame body
411 . . . First long side portion
412 . . . Second long side portion
413 . . . First short side portion
414 . . . Second short side portion
420 . . . Measuring instrument holder
440 . . . Automatic operation unit
441 . . . Motor housing
442 . . . Motor
443 . . . Motor controller
450 . . . Power transmission unit
451 . . . Anchor ring
452 . . . Rotation plate
453 . . . Transmission link rod
460 . . . Workpiece holding base portion
461 . . . Support pillar
462 . . . Workpiece placement plate

The invention claimed is:

1. An automatic measurement device that automatically measures a workpiece using a measuring instrument, the measuring instrument measuring a dimension of the workpiece, the automatic measurement device comprising:

the measuring instrument;
a measuring instrument support base portion that supports the measuring instrument; and
a workpiece holding base portion that holds the workpiece in a measurement region of the measuring instrument, wherein
the measuring instrument includes:
a fixed element;
a movable element provided to be displaceable with respect to the fixed element, the movable element advancing and retreating to approach and separate from the workpiece; and
a displacement detection unit configured to detect the displacement of the movable element, wherein
the measuring instrument support base portion includes:
a measuring instrument holder that holds the fixed element of the measuring instrument; and
an automatic operation unit attachable to and detachable from the measuring instrument, the automatic operation unit being configured to automate the advance and the retreat of the movable element by a power from a motor.

2. The automatic measurement device according to claim 1, wherein when the workpiece abuts on the movable element, at least one of the workpiece held to the workpiece holding base portion and the measuring instrument held to the measuring instrument holder changes a position and a posture at a pressure equal to or less than a predetermined measurement pressure preset to the measuring instrument such that the workpiece and the movable element are held with abutment surfaces mutually in close contact.

3. The automatic measurement device according to claim 2, wherein the workpiece holding base portion is a workpiece placement base on which the workpiece is placed.

4. The automatic measurement device according to claim 2, wherein
the workpiece holding base portion includes workpiece holding means that holds the workpiece, and
one of the workpiece holding means and the measuring instrument holder is provided so as to permit a relative displacement with respect to another.

5. The automatic measurement device according to claim 1, wherein
the measuring instrument includes an operation unit originally for a manual operation, and the operation unit is configured to advance and retreat the movable element by a manual rotation operation or a manual pushing operation, and
the automatic operation unit is attachable to/detachable from the operation unit, and the automatic operation unit is configured to operate the operation unit by the power from the motor to automate the advance and the retreat of the movable element.

6. The automatic measurement device according to claim 1, wherein
the measuring instrument is a micrometer,
the micrometer includes:
a U-shaped frame as the fixed element including an anvil at one end inside a U shape thereof; and
a spindle as the movable element provided on another end side of the U-shaped frame, the spindle being provided to be axially advanceable and retreatable with respect to the anvil, and
the automatic operation unit includes:
the motor; and
a power transmission unit configured to directly or indirectly connect an output shaft of the motor to the spindle to convert the power from the motor into the advance/retreat of the spindle.

7. The automatic measurement device according to claim 6, wherein
the automatic operation unit is provided such that a position is changeable in a direction orthogonal to a center axis of the spindle such that a rotation axis of a rotor of the motor is collinear with the center axis of the spindle.

8. The automatic measurement device according to claim 6, wherein
the micrometer includes a thimble disposed at another end of the spindle on another end side of the U-shape frame, and a rotation operation is performed on the thimble originally by a finger, and
the power transmission unit includes:
an anchor ring fitted to an outside of the thimble;
a rotation plate provided to rotate in synchronization with a rotation shaft of a rotor of the motor; and
a transmission link rod disposed parallel to a center axis of the spindle, the transmission link rod having one end fixed to the anchor ring and another end fixed to the rotation plate, the transmission link rod rotating with the center axis of the spindle as a center of the rotation to transmit the rotation of the rotation plate to the anchor ring.

9. The automatic measurement device according to claim 8, comprising
a constant pressure mechanism provided between the thimble and the spindle, the constant pressure mechanism being configured such that when a preset load is applied to the spindle, the constant pressure mechanism disengaging the thimble and the spindle to cause the thimble to idle with respect to the spindle.

10. The automatic measurement device according to claim 6, wherein
the automatic operation unit includes a motor controller configured to control a rotation of the motor,
the motor controller has a torque detection function of the motor,
the motor controller has, as a control mode of a motor rotation number:
a high-speed rotation mode as a high-speed rotation; and
a low-speed rotation mode at a speed lower than a rotation speed in the high-speed rotation mode,
when a motor rotation direction in a direction of advancing the spindle is defined as a forward rotation, and when the motor rotation direction in a direction of retreating the spindle is defined as a reverse direction, the motor controller is configured:
to advance the spindle in the forward rotation in the high-speed rotation mode;
such that when the torque detection function detects an abutment between the spindle and the workpiece, the motor controller retreats the spindle in the reverse rotation in the high-speed rotation mode by a predetermined first rotation number;
to subsequently advance the spindle in the forward rotation in the low-speed rotation mode by the first rotation number, and subsequently further drive the motor in the forward rotation in the low-speed rotation mode by a predetermined second rotation number; and
afterwards, to drive the motor in the forward rotation in the high-speed rotation mode by a predetermined third rotation number.

11. An automatic measurement system comprising:
the automatic measurement device according to claim 1; and
workpiece conveyance means configured to pick up the workpieces and sequentially convey the workpieces to the workpiece holding base portion.

12. An automatic measurement device that automates a measuring instrument, the measuring instrument causing a movable element to be in contact with a workpiece to measure a dimension of the workpiece, the automatic measurement device comprising:
a measuring instrument support base portion that supports the measuring instrument; and
a workpiece holding base portion that holds the workpiece in a measurement region of the measuring instrument, wherein
the measuring instrument support base portion includes:
a measuring instrument holder that holds a fixed element of the measuring instrument; and
an automatic operation unit attachable to and detachable from the measuring instrument, the automatic operation unit being configured to automate the advance and the retreat of the movable element by a power from a motor.

* * * * *